United States Patent
Cunningham, Jr.

[11] Patent Number: 6,161,802
[45] Date of Patent: Dec. 19, 2000

[54] TRAPPED VORTEX AIRFOIL NOSE

[75] Inventor: Atlee Marion Cunningham, Jr., Fort Worth, Tex.

[73] Assignee: Lockheed Martin Corporation, Bethesda, Md.

[21] Appl. No.: 09/250,220

[22] Filed: Feb. 9, 1999

[51] Int. Cl.[7] .............................. B64C 3/14; B64C 3/38; B64C 23/06

[52] U.S. Cl. ............................................. 244/199; 244/201

[58] Field of Search ................................ 244/35 R, 35 A, 244/198, 199, 201, 214

[56] References Cited

U.S. PATENT DOCUMENTS

| | | | |
|---|---|---|---|
| 1,427,012 | 8/1922 | Page | 244/214 X |
| 2,136,403 | 11/1938 | Vance et al. | |
| 2,916,230 | 12/1959 | Nial | |
| 3,568,956 | 3/1971 | Swanson | |
| 4,405,102 | 9/1983 | Taylor | |
| 5,299,762 | 4/1994 | Kosson et al. | 244/117 A |
| 5,836,549 | 11/1998 | Bushman | 244/35 R X |
| 5,927,656 | 7/1999 | Hinkleman | 244/214 X |

FOREIGN PATENT DOCUMENTS

| | | | |
|---|---|---|---|
| 2224096 | 4/1990 | United Kingdom | 244/201 |

*Primary Examiner*—Robert P. Swiatek
*Attorney, Agent, or Firm*—Felsman, Bradley, Vaden, Gunter & Dillon, L.L.P.; James E. Bradley

[57] ABSTRACT

An airplane has a plurality of airfoils with leading edges. A partition and a nose cap are located at a forward surface of the airfoil, creating upper and lower cavities. The nose cap may be positioned in an extended position or a retracted position. The nose cap is retracted when the airplane reaches supersonic speed. At supersonic speed, a shock wave forms on the leading edge of the airfoil. A compression zone forms between the shock wave and the leading edge, diverting the heat and pressure of the shock wave away from the airfoil. Downstream from the compressed zone, pressure wakes form along the airfoil and cool the airfoil. At subsonic speed, the nose cap is extended to achieve optimal airfoil efficiency. Forward or rearward gaps may be opened between the nose cap and the main body portion of the airfoil to allow airflow from the lower cavity below the partition to the upper cavity above the partition to selectively increase or decrease lift on the airfoil.

13 Claims, 4 Drawing Sheets

TRAPPED VORTEX AIRFOIL NOSE

TECHNICAL FIELD

This invention relates in general to aircraft and in particular to airfoil leading edge design.

BACKGROUND ART

Airfoil design is a critical component to achieving optimal performance in both fixed airfoils such as wings, tails and vertical stabilizers, and rotary airfoils such as propeller blades. The upstream or leading edge designs of prior art airfoils are generally smooth, convex, aerodynamic shapes regardless of the speed of the airflow encountered by the airfoil. However, subsonic airflow and supersonic airflow have different behavior characteristics when obstructions are encountered. Leading edge designs that permit efficient performance in one type of airflow may not be as efficient in the other type of airflow. For example, airfoils which are designed for supersonic airflow perform less efficiently in subsonic airflow due to the very sharp cross-sectional shape at the leading edge. Moreover, supersonic airfoils require expensive heat-resistant materials to avoid thermal damage to the airfoil due to the very high temperatures developed by shock waves in supersonic airflow. Supersonic jet aircraft need a leading edge design that is capable of being optimal for each type of airflow.

DISCLOSURE OF THE INVENTION

An airplane has a plurality of airfoils. Each airfoil has a main body portion having a substantially solid surface extending between upper and lower edges of the main body portion. Preferably, the substantially solid surface is concave. A flat elongated partition extends forward from the main body portion and is substantially centered between the upper and lower edges. A convex nose cap is positioned on a forward edge of the partition. The nose cap has upper and lower trailing edges spaced forward of the upper and lower edges, respectively, of the main body portion. The partition defines an upper cavity and a lower cavity which is located between the upper and lower trailing edges of the nose cap and the main body portion of the substantially solid surface of the airfoil. For supersonic aircraft, flying at subsonic velocity, the partition and nose cap are selectively extendable to a forward position relative to the main body portion. The partition and nose cap are also retractable to a rearward position relative to the main body portion for supersonic flight. Additionally, a forward gap may be opened near the nose cap and a rearward gap may be opened near the main body portion to affect lift characteristics of the airfoil.

By opening a forward gap in the partition, airflow from the lower cavity to the forward portion of the upper cavity augments a standing upper vortex in the upper cavity. The standing upper vortex creates a strong feeding sheer layer that results in attached upper flow on the upper surface of the airfoil. By opening a rearward gap in the partition, airflow is developed from the lower cavity to a rearward portion of the upper cavity that diminishes the upper vortex and generates chaotic separated flow in the upper cavity. The chaotic separated flow results in a lift loss due to upper surface stalling on the airfoil. A loss of lift on an airfoil surface can assist in generating a rolling moment for an aircraft.

A slidably positional actuator is located in the airfoil. The actuator is slidable in a direction generally parallel to the mean plane of the airfoil. A plurality of cams are positioned on the actuator for positioning the partition at a selected location relative to the main body portion of the airfoil. A separate actuator is provided to position the partition to open forward and rearward gaps to affect lift on the airfoil.

At supersonic speed, a shockwave forms proximate the leading portion of the airfoil. When the nose cap is fully retracted, a compression zone forms proximate the leading portion. The compression zone becomes the effective leading edge of the airfoil. Located between the shockwave and the leading portion, the compression zone diverts heat and pressure generated by a shockwave away from the airfoil. Downstream from the compressed zone, pressure wakes form along the lateral surfaces of the airfoil and cool the surfaces to a temperature below what would normally be encountered with a conventional airfoil. At subsonic speed, the nose cap may be extended to a forward position to achieve optimal airfoil efficiency.

BEST MODE FOR CARRYING OUT THE INVENTION

Figure 1:
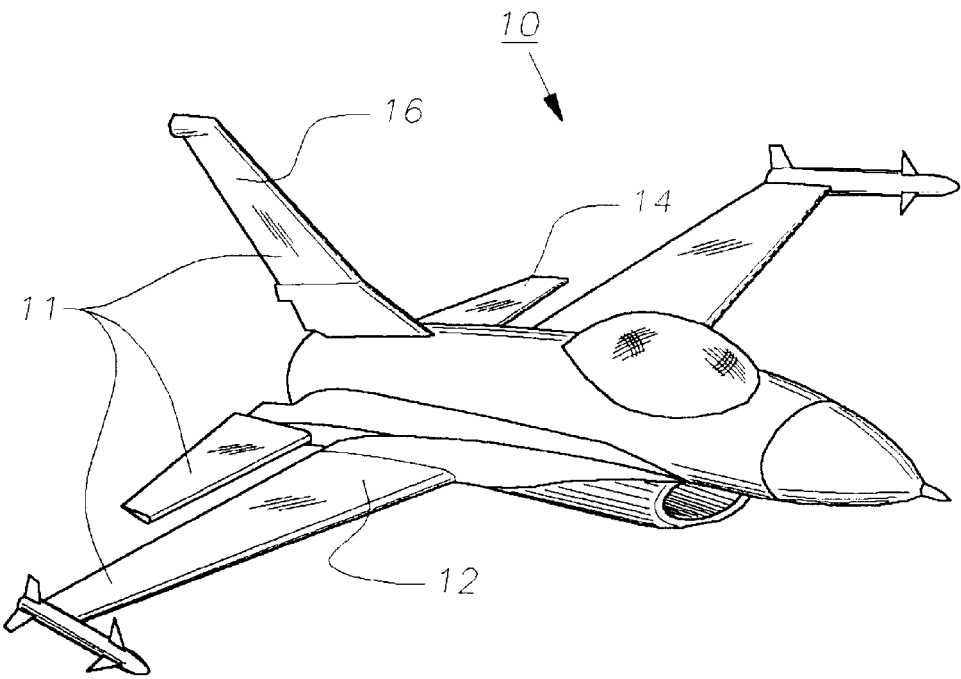
FIG. 1 is a schematic drawing of an airplane constructed in accordance with the invention.
Figure 2:
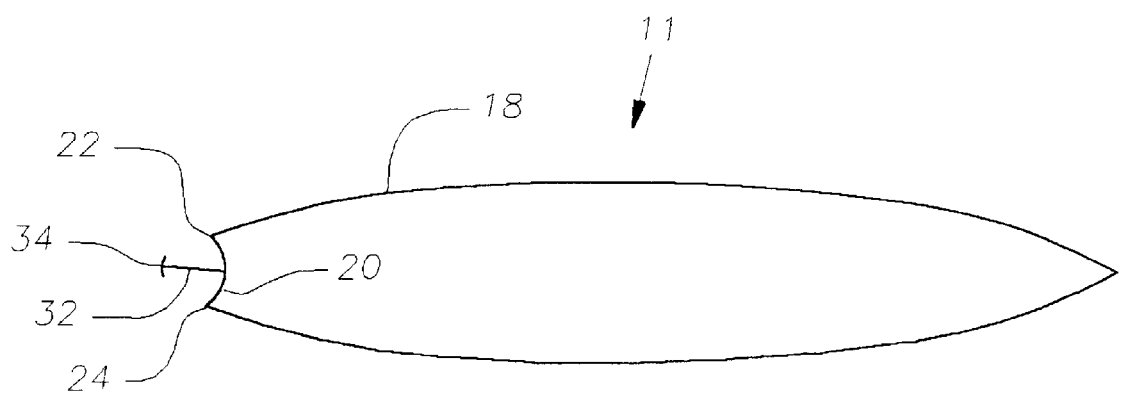
FIG. 2 is a cross-sectional view of an airfoil section constructed in accordance with the invention.

Referring to FIG. 1, a jet airplane 10 capable of supersonic flight is shown. Airplane 10 has a plurality of airfoils 11 including wings 12, tail fins 14 and a vertical stabilizer 16. As shown in FIG. 2, airfoil 11 has a main body portion 18 having a substantially solid concave surface 20 extending between an upper edge 22 and a lower edge 24 of main body portion 18. Other shapes for the main body portion may be utilized. Concave surfaces 20 have various degrees of curvature including being substantially flat. Concave surface 20 is elongated and extends substantially the length of the airfoil 11.

Figure 3:
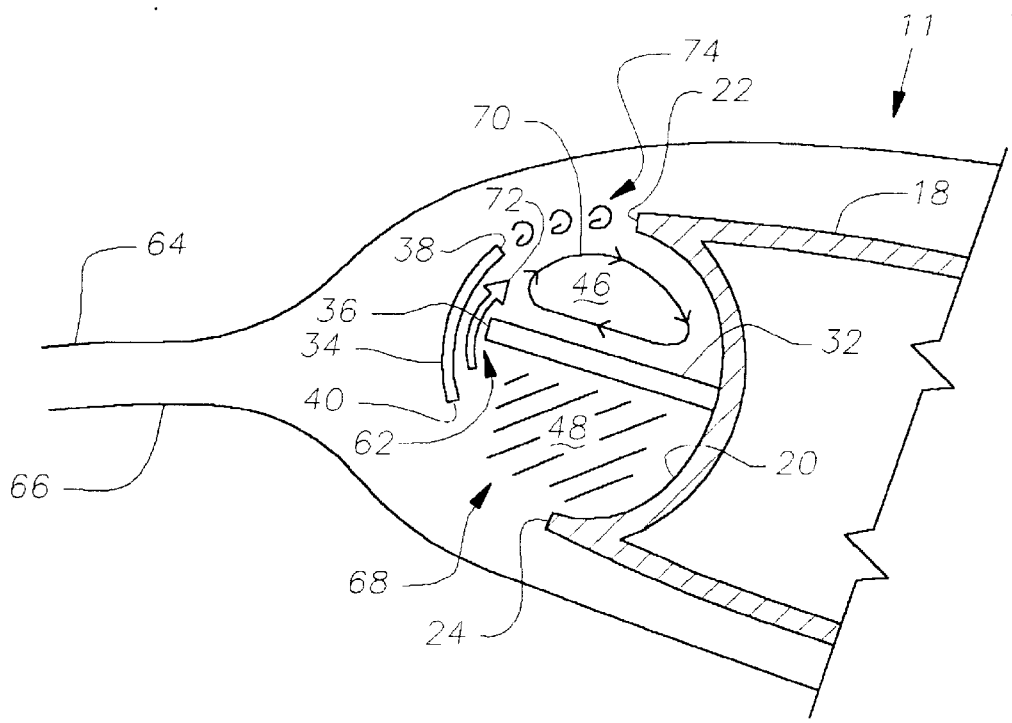
FIG. 3 is a partial sectional view of a leading edge of an airfoil on the airplane in FIG. 1 experiencing a high incidence and is shown with a nose cap in an extended position and having a forward gap for increasing lift.
Figure 7:
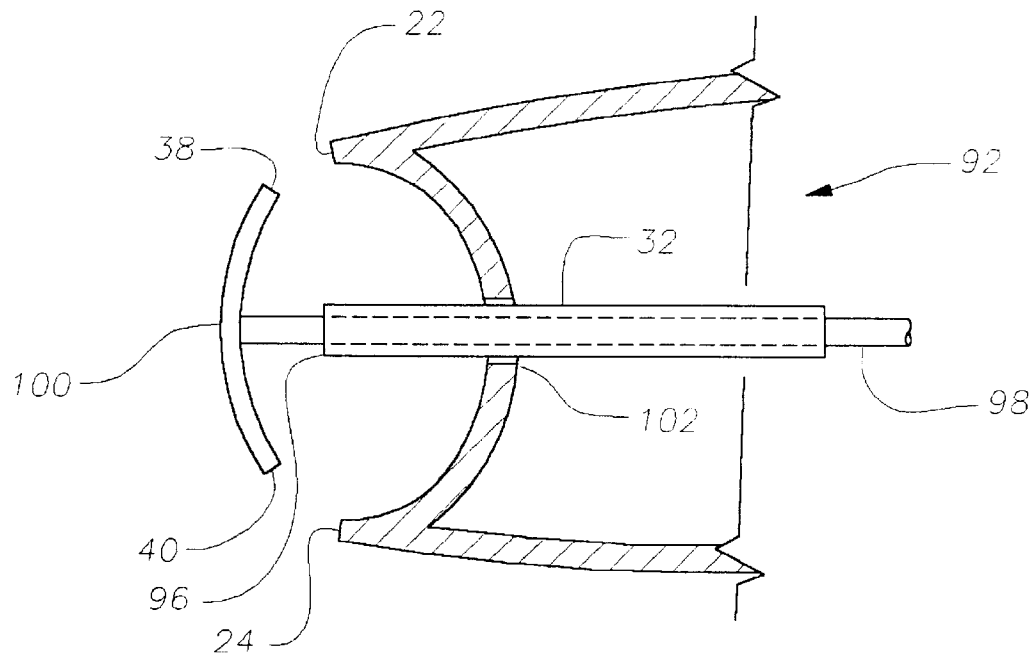
FIG. 7 is a partial sectional view of the leading edge of an airfoil of the airplane in FIG. 1 showing a sectional view of the partition and nose cap assembly.

Referring to FIG. 3, a partition 32 extends forward from main body portion 18 and is substantially centered between upper edge 22 and lower edge 24. A convex nose cap 34 is positioned on a forward edge 36 of partition 32. Nose cap 34 has an upper trailing edge 38 and lower trailing edge 40 spaced forward of upper edge 22 and lower edge 24, respectively, shown in FIGS. 3, 4, and 7. Nose cap 34 is positioned and has a curvature selected to resemble a conventional leading edge of a conventional airfoil. The nose cap 34 defines an upper cavity 46 and a lower cavity 48 between upper and lower trailing edges 38, 40 and main body portion 18.

Partition 32 is movable in forward and rearward directions relative to nose cap 34 and concave surface 20. This movement selectively creates a forward gap 62 (FIG. 3) between nose cap 34 and partition 32, and a rearward gap 76 (FIG. 4) between partition 32 and concave surface 20.

At subsonic flow, when airfoil 11 is positioned at a higher incidence, as shown in FIG. 3, it may be desirable to open forward gap 62 while closing rearward gap 76, as is shown in FIG. 3. Upper streamline 64 and lower streamline 66 are shown in FIG. 3. When positioned at a high incident angle, a high pressure stagnation region 68 is formed in lower cavity 48. A strong upper vortex 70 is generated in upper cavity 46. Upper vortex 70 is enhanced by forward jet 72, which passes through forward gap 62. Forward jet 72 results from a pressure differential between the upper cavity 46 and the lower cavity 48. A strong feeding sheer layer 74 is generated above upper vortex 70. The augmented upper vortex 70 helps to turn flow and avoid separation, which results in an increase in lift acting on airfoil 11.

Figure 4:
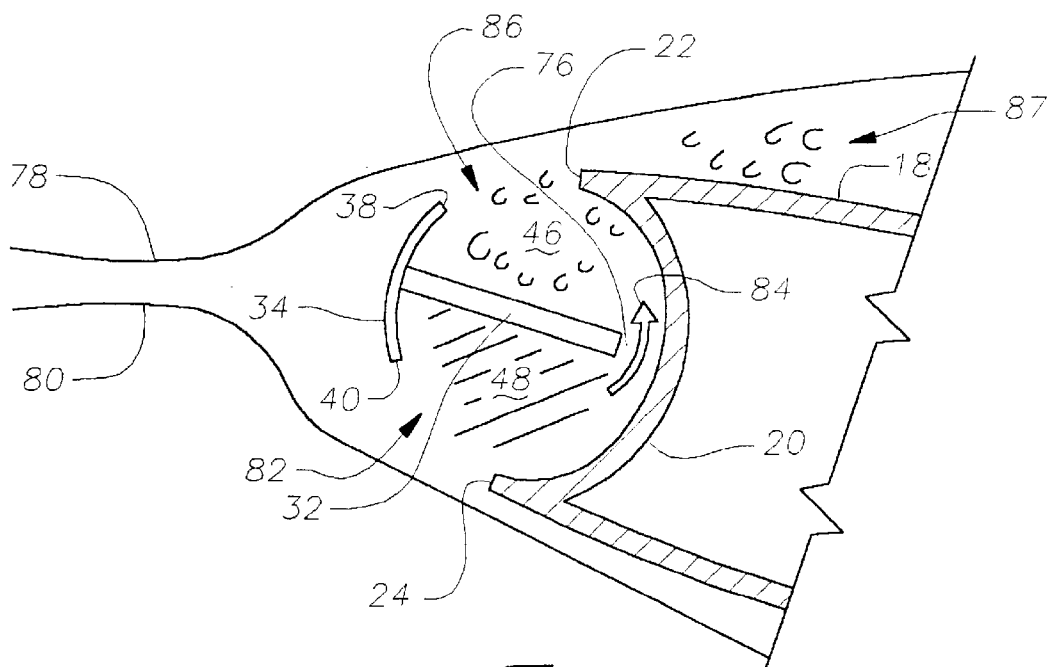
FIG. 4 is a partial sectional view of a leading edge of an airfoil on the airplane in FIG. 1 experiencing a high incidence and is shown with a nose cap in an extended position and having a rearward gap for decreasing lift.

Decreasing lift on airfoil 11 may be desirable to facilitate a rolling moment for aircraft 10 while at subsonic speeds. A decrease in lift may be generated by forming rearward gap 76 between partition 32 and concave surface 22, as shown in FIG. 4. Upper streamline 78 and lower streamline 80 are shown engaging airfoil 11, which is shown at a high angle of incidence. An area of high pressure stagnation 82 is generated in the lower cavity 48. Rearward jet 84 passes through rearward gap 76 into upper cavity 46, which nullifies the formation of an upper vortex and results in a region of chaotic flow 86. As a consequence of the region of chaotic flow 86, upper surface stalling results, designated generally 87, on an upper surface of airfoil 11, thereby resulting in lift loss.

Figure 5:
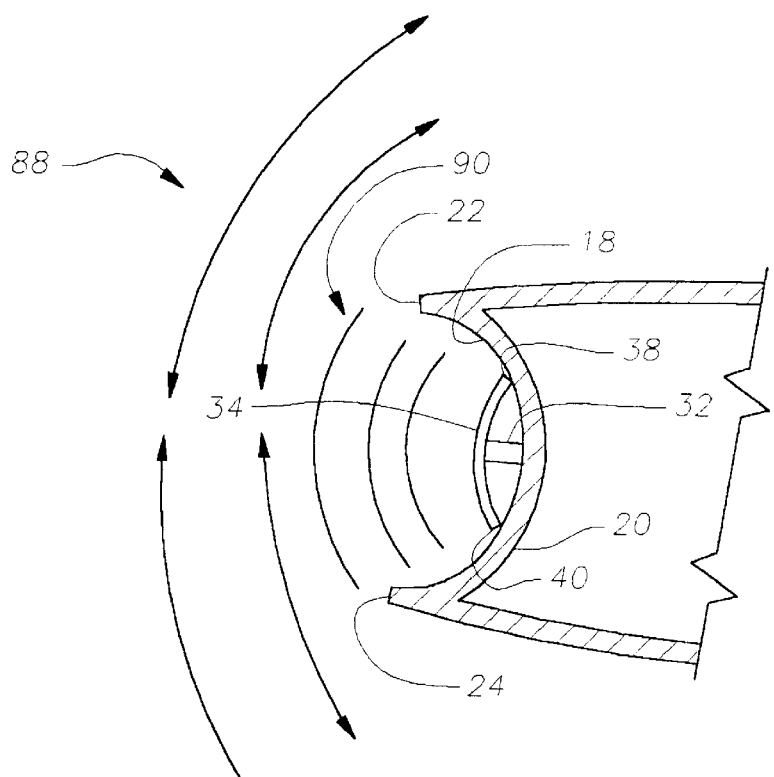
FIG. 5 is a partial sectional view of the leading edge of an airfoil on the airplane in FIG. 1 with a nose cap in a retracted position while encountering supersonic airflow.

Partition 32 and convex nose cap 34 may be retracted as shown in FIG. 5 to a position where the trailing edges 38, 40 of nose cap 34 abut concave surface 20. Nose cap 34 is moved to the retracted position when airplane 10 is accelerating toward supersonic speed. At supersonic speed, shockwaves 88 form forward of main body portion 18. However, with the concave profile 20 of main body portion 18, a compression zone 90 becomes the effective leading edge of airfoil 11. Compression zone 90 is located between shockwave 88 and concave profile 20 and diverts heat and pressure of shockwave 88 away from airfoil 11. Downstream from compression zone 90, pressure wakes (not shown) form along the lateral or downstream surfaces of airfoil 11, causing the ambient surrounding gas to expand. Expanding gas cools surfaces of airfoil 11 to a temperature below what would normally be encountered with a conventional airfoil.

At subsonic speed, nose cap 34 and partition 32 are extended to an extended position to achieve optimal airfoil efficiency as shown in FIGS. 2, 3, 4 and 7.

Figure 6:
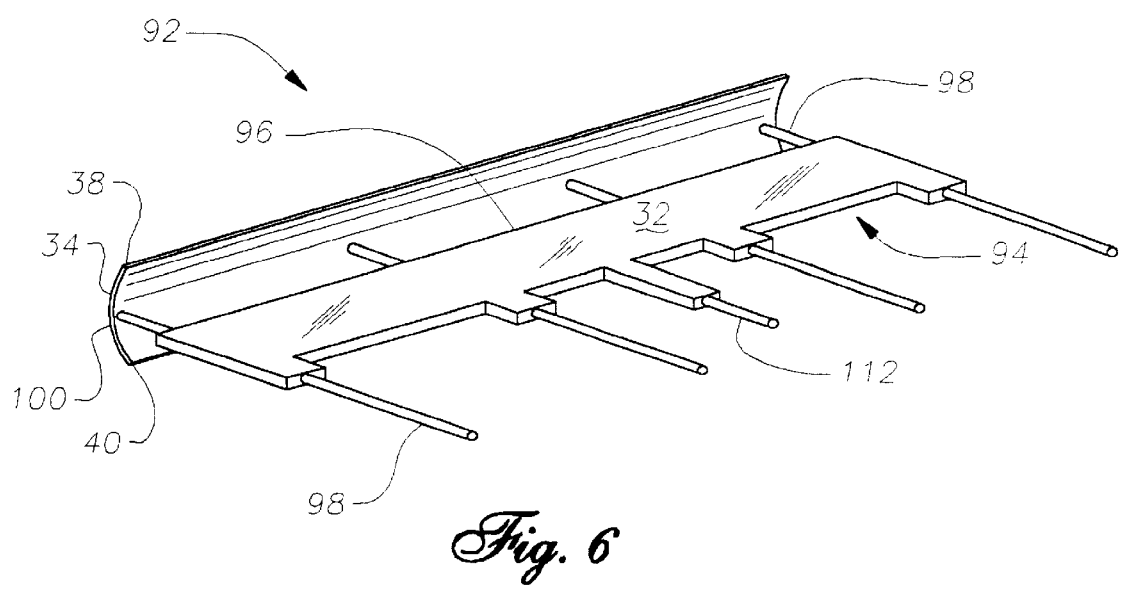
FIG. 6 is a perspective view of the partition and the nose cap assembly.
Figure 8:
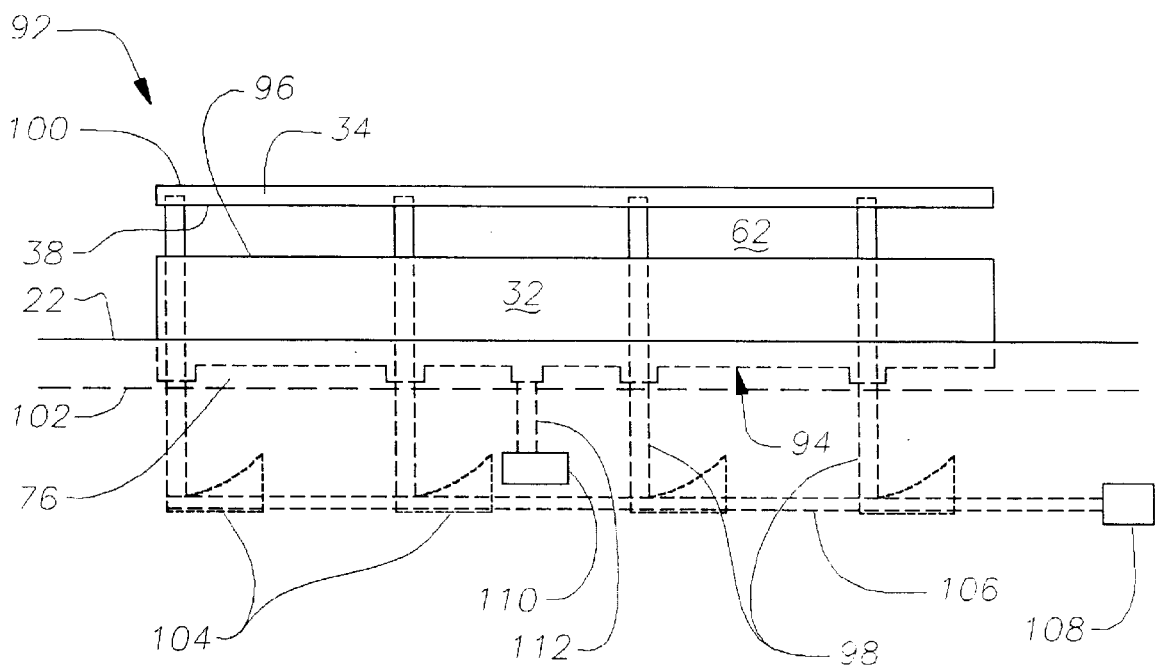
FIG. 8 is a top view of the partition and nose cap assembly and mechanism for extending and retracting the partition and nose cap assembly.

In one embodiment, a nose cap partition assembly 92 (FIGS. 6–8) is used to extend and retract nose cap 34 and to open and close forward gap 62 and rearward gap 76. Partition 32 has a plurality of rearward recesses 94 formed thereon and a forward end 96 on a front end of partition 32. Nose cap 34 is mounted on a plurality of support rods 98, which are slidably received within partition 32. Support rods 98 are preferably affixed to nose cap 34 at nose cap apex 100. Partition 32 extends through a slot 102 in concave surface 20 midpoint between upper leading edge 22 and lower leading edge 24. Nose cap 34 is retracted and extended by a plurality of nose cap mover cams 104 that are moved on actuating rod 106 by actuator 108. Actuating rod 106 is preferably oriented generally parallel to the mean plane of the airfoil.

Partition 32 is extended and retracted relative to main body portion 18 and nose cap 34 to create forward gaps 62 or rearward gaps 76. For illustrative purposes in FIG. 8, partition 32 is extended such that rearward recesses 94 are forward of slot 102, thereby creating rearward gaps 76 at recesses 94. Additionally, nose cap 34 is extended on support rods 98 so that forward gap 62 is created between nose cap 34 and forward end 96 of partition 32. In operation, when partition 32 is retracted, rearward gaps 76 close. Partition 32 is moved forward or rearward independent of nose cap 34 by means of motor 110 acting on partition mover 112.

The invention has several advantages. When encountering supersonic airflow, a concave main body portion along the leading edge of a wing permits superior flight efficiency by reducing drag and limiting a temperature increase in the airfoil. As a result, less costly materials may be employed in the manufacture of the airfoil. For subsonic flow, extending the nose cap creates cavities for reducing separation losses. Additionally, in the case of subsonic flow, a selectively openable forward gap behind the nose cap increases lift on the airfoil. A selectively openable rearward gap allows for a controllable decrease in lift on the airfoil.

With the retractable and extendable nose cap, the leading edge profile may be changed for optimal performance in both supersonic and subsonic airflow. While the invention has been shown in only one of its forms, it should be apparent to those skilled in the art that it is not so limited, but is susceptible to various changes without departing from the scope of the invention. For example, in a purely subsonic aircraft, the nose cap and partition could be fixed and the gaps removed.

I claim:

1. An airfoil for an aircraft, comprising in combination:
    a main body portion having an upper edge and a lower edge;
    a partition extending forward from said main body portion, substantially centered between said upper edge and said lower edge; and
    a convex nose cap on a forward end of said partition, said nose cap having an upper trailing edge and a lower trailing edge spaced forward of the upper and lower edges, respectively, of the main body portion, defining an upper cavity and a lower cavity separated by said partition.

2. The airfoil according to claim 1 wherein said partition and said nose cap are elongated and extend substantially the length of the airfoil.

3. The airfoil according to claim 1 wherein said partition is movable in a forward direction and a rearward direction relative to said nose cap to selectively define a forward gap proximate said nose cap for allowing flow of air from the lower cavity to a forward portion of the upper cavity.

4. The airfoil according to claim 1 wherein said partition is movable in a forward direction and a rearward direction relative to said main body portion to selectively define a rearward gap proximate said main body portion for allowing flow of air from the lower cavity to a rearward portion of the upper cavity.

5. The airfoil according to claim 1 further comprising a substantially solid surface extending between said upper and lower edges of the main body portion.

6. The airfoil according to claim 1 further comprising a substantially solid concave surface extending between the upper and lower edges of the main body portion.

7. The airfoil according to claim 1 wherein said partition and said nose cap are movable in a rearward direction relative to said main body portion to a retracted position where the trailing edges of the nose cap abut the solid surface.

8. An airfoil for an aircraft, comprising in combination:

a main body portion having an upper edge and a lower edge and a substantially solid concave surface extending between said upper and lower edges;

a flat, elongated partition extending forward from said main body portion substantially centered between said upper and lower edges; and a convex nose cap on a forward end of said partition, the nose cap having an upper trailing edge and a lower trailing edge spaced forward of said upper and lower edges, respectively, of the main body portion, defining an upper cavity and lower cavity separated by said partition, wherein said partition and said nose cap are movable in a forward and rearward direction relative to said main body portion between an extended position for subsonic flow on a retracted position with the trailing edges abutting the concave surface for supersonic flow.

9. The airfoil according to claim 8 wherein said partition is further movable in said forward direction and said rearward direction relative to said nose cap to selectively define a forward gap proximate said nose cap for allowing flow of air from said lower cavity to a forward portion of said upper cavity.

10. The airfoil according to claim 8 wherein said partition is further movable in said forward direction and said rearward direction relative to said main body portion to selectively define a rearward gap proximate said concave surface for allowing flow of air from said lower cavity to a rearward portion of said upper cavity.

11. An airfoil for an aircraft, comprising in combination:

a main body portion having an upper edge and a lower edge;

a flat, elongated partition extending forward from said main body portion, substantially centered between said upper and lower edges; and a convex nose cap on a forward end of said partition, the nose cap having an upper trailing edge and a lower trailing edge spaced forward of said upper and lower edges, respectively, of the main body portion, defining upper and lower cavities separated by the partition, wherein said partition is movable in a forward and rearward direction relative to said nose cap to selectively define a forward gap proximate said nose cap, and said partition is movable in a forward and rearward direction relative to said main body portion to selectively define a rearward gap proximate said main body portion, said forward gap and said rearward gap allowing flow of air from the lower cavity to the upper cavity.

12. An airfoil for an aircraft according to claim 11 further comprising a slidably positionable actuator in the airfoil, said actuator slidable generally parallel to a mean plane of the airfoil, and a plurality of cams on said actuator for positioning said partition at a selected position relative to said main body portion of said airfoil.

13. A method of selectively increasing and decreasing lift on an airfoil, comprising:

mounting a partition on a forward surface of said airfoil;

mounting a nose cap to said airfoil at a forward end of said partition, the partition defining an upper cavity and a lower cavity;

selectively opening a forward gap in the partition proximate to the nose cap to allow flow of air from the lower cavity to a forward portion of the upper cavity to augment a standing upper vortex for increasing lift; and selectively opening a rearward gap in said partition proximate said forward surface of said air foil to allow a flow of air from the lower cavity to a rearward portion of the upper cavity for generating chaotic separated flow in the upper cavity for decreasing lift.

\* \* \* \* \*